United States Patent Office 2,791,533
Patented May 7, 1957

2,791,533

ION EXCHANGE RESIN INDICATOR COMPOUND

Harry L. Segal and Leon L. Miller, Rochester, N. Y., assignors to Security Trust Company, Rochester, N. Y., as trustee for Harry L. Segal Medical Research Fund No Drawing. Application February 24, 1951,
Serial No. 212,698

4 Claims. (Cl. 167—84.5)

This invention relates to biological tests with ion exchange resins, and more particularly to ion exchange resin indicator compounds capable of indicating certain biological conditions.

It is an object of this invention to provide ion exchange compound of specific quantitative composition capable of indicating the presence or absence of certain chemical conditions in the stomach.

It is a further object of this invention to provide ion exchange compounds containing identifiable components for indicating certain chemical conditions of the stomach.

It is a still further object of this invention to provide ion exchange compounds easily prepared from commercially available ion exchange resin which compounds will contain identifiable components for indicating certain chemical conditions.

It is another object of this invention to provide quantitative criteria for preparing from ion exchange resins certain new ion exchange compounds which contain identifiable components for indicating certain chemical conditions.

In general, the new compounds of this invention comprise ion exchange resins and quantitatively critical amounts of ions having distinctive and identifiable characteristics when released from the compound by ion exchange reaction.

It is a novel purpose of this invention to describe the preparation of exchange resin indicator compounds of predetermined critical quantitative composition for the novel purpose of determining the presence or absence of free gastric hydrochloric acid in human subjects while avoiding the troublesome and difficult procedure of passing a tube directly into the stomach.

The ion exchange resin indicator compounds of this invention may be prepared from commercially available cation and anion exchange resins such as Amberlite IR-100, granular copolymer methacrylic acid and divinyl benzene, Amberlite IR-4B and Amberlite IRA-400, carboxilated phenol formaldehyde and similar compounds.

The ion exchange resin indicator compounds of this invention, therefore, may be derived from either cation exchangers or anion exchangers depending upon the primary ion exchange resin selected as a source material. The selection of the primary source material in turn depends upon the charge of the indicating ion which it is desired to incorporate into the ion exchange resin indicator compound.

These displaceable indicating ions may be selected from a group of dyes or other substances innocuous to humans and which exist in solution as cations or anions. These cations or anions are incorporated into the ion exchange resin indicator compound in quantitatively critical amounts by the method of this invention to provide the new testing compound of this invention. The ion exchange resin indicator compounds thus produced have a range of properties which make them respond in such a manner to various chemical conditions of the stomach that the indicator ion will become displaced therefrom and manifest itself in any of a number of ways and thus establish the presence or absence of certain chemical conditions. The ion exchange compounds are thus responsive to a variety of ions present in chemical solutions. It has been discovered that as a result of the quantitative amounts of the cations or anions which are incorporated in the ion exchange resin indicator compound it is possible to detect given concentrations of given ions in the tested compound. One such determination is the presence or absence of ions at a given concentration. In this description the minimal concentration referred to is one such given concentration.

A specific use of an ion exchange resin indicator compound of this invention is in the qualitative and/or quantitative ascertainment of an acid condition. Under certain conditions positively charged hydrogen ions indicate a certain hydrochloric acid concentration. The determination of hydrochloric acid concentration may indicate or help to indicate certain types of conditions. This hydrochloric acid concentration can be determined by a method which detects the hydrogen ions present. These hydrogen cations will be available to cause an ion exchange reaction with a compound of this invention and, by thus displacing the identifiable ions out of the specific ion exchange resin indicator compound, the presence of the hydrogen ions and their minimal concentration may be detected by suitable tests for identification.

For example, the cation quininium may be incorporated into a cation exchange resin by treating a known amount of the latter with a solution of a predetermined amount of quinine hydrochloride to form one of the newly invented ion exchange indicator compounds. This cation resin quininium compound when present in the chemical solution tested will undergo an ion exchange with hydrogen cations above a certain concentration in which exchange the positive quininium ion is released and forms with the chloride anion a solution of quinine hydrochloride. The quininium ion then will appear in solution. Thus the ion exchange resin indicator compound of this invention given in certain dosages provides an indicator for determining the presence or absence of a certain acid concentration.

The cation exchange resin indicator compound is initially prepared from the cation exchanger commercially available as a granular copolymer of methacrylic acid and divinyl benzene. This ion exchange resin is conditioned, as described later, and then is treated with a solution containing a critically predetermined amount of quinine hydrochloride. The resulting ion exchange resin indicator compound is removed from the solution, washed and dried, and thus prepared for use. One such use of the quininium resin indicator compound thus prepared is exemplified by the oral administration to the stomach where it is exposed to the cations present in solution in the gastric juice. The hydrogen ions of the hydrochloric acid of the gastric juice represent such cations and when present in a concentration in excess of a predetermined level will displace the quininium ion from the resin compound into solution. The hydrogen ions which have displaced the quininium cations combine with the ion exchange resin and are thus rendered insoluble. The quininium ions go into solution as quinine hydrochloride and provide a basis for the indication of the presence of hydrogen ions in the stomach juice by taking advantage of the fact that the quinine HCl is immediately absorbed into the blood and a certain percentage begins to appear in the urine within 15 minutes.

Anion exchange resins such as Amberlite IR–4B or Amberlite IRA–400 (Rohm and Haas Company) can be treated in a comparable manner to that described for the cation exchange resins. If such an anion exchange resin is used, it is first treated with a predetermined critical amount of a soluble negatively charged dyestuff ion or other easily detectable anions.

In case of the newly invented anion resin indicator compound, chemical conditions of the stomach, both normal and abnormal, may be determined. In the presence of at least a minimal critical amount of hydrochloric acid, the $Cl^-$ ions and incidentally but importantly the $H^+$ ions of the acid will be bound by this anion exchange indicator compound, and thus displace the anion dye or indicator substance. The anion dye so displaced goes into solution and its presence is readily ascertained by appropriate tests.

As indicated, one application of this invention is the determination of the presence or absence of free gastric hydrochloric acid in human subjects. In connection with this determination of the presence or absence of free gastric hydrochloric acid, it has been discovered that the determination is dependent upon a predetermined quantitative composition of the ion exchange resin indicator compound. The hydrogen ion ($H^+$) will preferentially displace other cations from the cation exchange resin indicator compound of this invention in chemically equivalent amounts. 0.05 millimole of hydrogen ($H^+$) cation will displace 0.05 millimole of a cation indicator from the cation exchange resin indicator compound of this invention. Where, for example, the quininium cation ($QH^+$) is employed as the indicator cation, 0.05 millimole of hydrogen ($H^+$) will displace 0.05 millimole of the quininium cation ($QH^+$) from the cation exchange resin indicator compound.

The cation exchange resin indicator compound may be prepared to have varying amounts of indicator cation combined with it. This amount of indicator cation combined in the ion exchange resin indicator compound has both a critical maximum and a critical minimum according to this invention. The critical maximum and the critical minimum amounts of indicator cation in any ion exchange resin indicator compound are determined by the ion condition which is being tested. The critical amounts relate to the total dose but in relating to the total dose they also establish critical amounts of indicator cation per gram of dose according to the size of the given dose. Referring to a test for the presence or absence of ions in a solution such as hydrogen ions in gastric juice, the critical amounts of indicator cation in the ion exchange resin indicator compound will be determined according to this invention by the concentration which is to be established by the test. That is, that for any given concentration which is being tested for, the amount of indicator ion incorporated in the ion exchange resin indicator compound will be critical. In the case of the test set forth herein, the detection of a minimal quantity of gastric hydrochloric acid of a given concentration can be accurately established only if a given concentration of indicator ions is present in the ion exchange resin indicator compound. This is true whether a cation or an anion exchange resin indicator compound is used. In the following discussion, therefore, when referring generally to this invention, it will be understood that the invention applies equally to both anion exchange resin indicator compound and cation exchange resin indicator compounds. According to this invention, at least a minimum of indicator cations must be available for displacement by the hydrogen ($H^+$) cations of hydrochloric acid in order to obtain a clinically accurate determination of small amounts of the acid in the gastric juice.

Likewise, there is a critical maximum amount of indicator cations which may be administered in a given dose of the cation exchange resin indicator compound for the detection of the minimal quantity of gastric hydrochloric acid. It is known that other cations such as sodium ($Na^+$) and calcium ($Ca^{++}$) are present in the gastric intestinal fluids. It has been discovered that such cations may also displace some of the indicator cations of the cation exchange resin indicator compound of this invention. If a large excess of the indicator cations in the cation exchange resin indicator compound is available then the indicator cations may be displaced from the indicator compound in a quantity large enough to interfere with the accuracy of this test for determining a minimal quantity of $H^+$ ions in the stomach secretion. Consequently, it has been discovered that there is a critical maximum of the proportion of indicator cation in the cation exchange resin indicator compound as well as a critical minimum. It has been discovered that because of several factors, such as rapid gastric emptying the destruction of some of the indicator cations by the body tissues and the ability to avoid the complication of releasing indicator cations other than hydrogen ions of the stomach permits the critical maximum amount of indicator cation to be as high as 0.50 millimole of indicator cation per dose of cation exchange resin indicator compound. Thus, for individuals who excrete no hydrochloric acid it is preferred that the dose of ion exchange resin indicator compound not contain more than .5 millimole of indicator cation per dose of indicator compound. In order that the release of indicator cations, but cations other than the hydrogen ions of the stomach be prevented from giving a false indication of hydrogen ions in the gastric juice, it is thus preferred that the total amount of indicator cation compound in the cation exchange resin compound of a given dose be limited to .5 millimole or less.

Conversely, it has been discovered that the detection of the minimal quantity of gastric hydrochloric acid can be infallibly determined only if enough indicator cations are entered in the cation exchange resin indicator compound to be released in determinable amounts by the minimal quantity of hydrogen cations in the gastric juice. In testing for the presence of the minimal quantity in gastric juice excreted from a high acid stomach, the minimum quantity of indicator cation necessary in the ion exchange resin indicator compound may be as low as .01 millimole per dose of cation exchange resin indicator compound. In testing for the minimal quantity of gastric hydrochloric acid in gastric juice in stomachs having a low secretion of acid, the minimum quantity of indicator cation in the dose of cation exchange resin indicator compound will be proportionately higher. In every case, a minimum quantity of .05 millimole of indicator cation in a dose of cation exchange resin indicator compound will be sufficient to definitely establish the presence of the normal minimal quantity of gastric hydrochloric acid in the concentration of .05 millimole of hydrogen ($H^+$) cations present in the stomach. The average normal adult human stomach will when properly stimulated secrete a volume of gastric juice of 50 to 200 milliliters in one hour. This secretion contains hydrochloric acid in a concentration of 0.15 to 0.001 millimole per milliliter. Thus, the maximum amount of hydrochloric acid normally produced is about 200 times 0.15 or 30 millimoles per quantity of gastric juice excreted in one hour. The minimum amount of hydrochloric acid normally produced in one hour of secretion is $50 \times .001$ or .05 millimole per hour of secretion of gastric juice. The presence of less than .05 millimole of hydrochloric acid in the stomach per hour of secretion is abnormal. It is the detection of this normal minimal quantity of hydrochloric acid in a normal one hour secretion of gastric juice that is the test described in this embodiment of this invention.

It is preferred that the cation exchange resin indicator compound of this invention be administered in a 2 gram dose for a given test of the presense of a normal minimal quantity of hydrogen (H+) cations in the gastric juice. This 2 gram dose is preferably made up of cation exchange resin indicator compound containing preferably at least approximately 0.05 millimole of indicator cation per dose of cation exchange resin indicator compound and not more than 0.50 millimole of cation indicator per dose of cation exchange resin indicator compound. The amount of the dose may be increased with a proportionate decrease of the concentration of indicator ion per gram of ion exchange resin indicator compound. It is preferred that the total concentration of indicator ion be limited to 0.50 millimole of the total ion exchange resin indicator compound in the dose for a given test. With such a concentration the dose of the indicator compound can be as low as one gram in the determination of the presence of the normal minimal quantity of hydrochloric acid in gastric juice. Consequently, with a concentration of 0.01 millimole of indicator ion per gram of resin indicator compound, the amount of the dose may be increased up to 50 grams. This same range of preferred limits of indicator ion applies to the use of an ion exchange resin indicator compound with an indicator anion as well as to the cation exchange resin indicator compound.

It is stated that for an accurate determination of the presence or absence of a normal minimal quantity of hydrochloric acid in gastric juice secreted in an hour period that it is preferred that an ion exchange resin compound of this invention contain a minimum of .05 millimole of indicator per dose, where the gastric juice has a low or borderline concentration of hydrochloric acid. However, results are obtained with this invention with amounts of indicator ion below .05 millimole of indicator ion per dose or with amounts of .04 millimole of indicator per dose.

The preferred range of concentrations in the test for the presence of hydrogen (H+) cations in gastric juice set forth above is based upon this invention. This invention discloses that the concentration of the indicator ion in the dose of ion exchange resin indicator compound in a test is limited to a range and that this range is determined by the ionic character of the solution tested and the incidental solutions to which the ion exchange resin indicator compound is subjected before the determination takes place. Consequently, with an indicator ion concentration of 0.01 millimole of indicator ion per gram of ion exchange resin indicator compound results according to this invention are preferably obtained with a dose in excess of 4 and up to 50 grams. Similarly, with an increase of the per gram concentration of indicator ion, the total dose per test must be reduced keeping the total indicator ion concentrations less than .50 millimole of the total resin indicator compound in the dose.

In order that this invention may be more fully understood, the following examples are given by way of illustration, but it is to be understood that the invention is not limited thereto as will be more specifically pointed out hereinafter.

EXAMPLE I

A cation exchange resin granular copolymer of methacrylic acid and divinyl benzene is first conditioned according to general directions of the manufacturer and is used for the preparation of the ion exchange compounds of this invention in: (a) the acid form in which the carboxyl groups of the resin exist completely in the free —COOH form; (b) in the partially neutralized form in which the cation exchange resin in question is so treated with a suitable buffer that a portion of the carboxyl groups of the resin are neutralized and exist in the —COONa form; (c) in which the carboxyl groups of the resin are completely neutralized so that they exist entirely in the —COONa form.

The conditioned resin was treated with an aqueous solution of a predetermined critical amount of quinine hydrochloride to bring about an exchange reaction of a given amount of the resin with the quininium cation of the quinine hydrochloride according to the following exchange reaction:

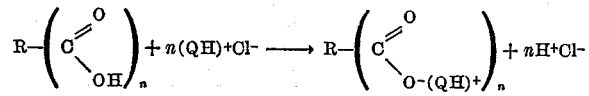

One gram of the quininium resin indicator compound thus formed contains the predetermined concentration of quininium cations corresponding to 18.4 mg. of quinine hydrochloride (0.057 millimole quinine per gram resin).

This newly invented quininium resin indicator compound (IEC—QH) was then subjected to the hydrogen ion activity present in dilute HCl solutions of varying hydrogen ion concentrations. It was also subjected to the cations present in solutions of sodium chloride, potassium chloride, calcium chloride, magnesium chloride, and a combination of sodium, potassium, and calcium chloride in solution. This cation exchange resin indicator compound was also subjected to the cations present in solutions of gastric juice of varying hydrogen ion concentrations. The mixture of the quininium resin indicator compound was kept in constant motion in the solution tested by allowing air to flow slowly through it for ten minutes. The quininium cation present in the quininium resin indicator compound when displaced by hydrogen cations or any other cation was manifested by the fluorescence observed when the solution was exposed to ultra violet rays. One-tenth gram of quininium indicator compound was placed in each of the ten test tubes to each of which was added 10 ml. of HCl solution varying in H+ ion activity from 0.1 N (pH 1 ) to $10^{-7}$ N (pH 7). The temperature was constant at 37.5° C. and the mixtures were stirred by a slow stream of air.

The following Table I shows that the quininium cation was displaced from the resin indicator compound when the hydrogen ion concentration of the HCl solution was 0.00079 N (pH 3.1) or above this concentration (i. e. with a pH less than 3.1). The presence of the quininium cation is demonstrated by the fluorescence observed when the solution is exposed to ultra violet rays.

Table I

| N | pH | Fluorescence |
|---|---|---|
| 0.10 | 1.0 | Strong |
| 0.32 | 1.5 | Strong |
| 0.10 | 2.0 | Strong |
| 0.0032 | 2.5 | Strong |
| 0.0025 | 2.6 | Strong |
| 0.0020 | 2.7 | Medium |
| 0.00079 | 3.1 | Faint |
| $10^{-4}$ | 4.0 | None |
| $10^{-5}$ | 5.0 | None |
| $10^{-6}$ | 6.0 | None |
| $10^{-7}$ | 7.0 | None |

The displacing effect on quininium cations of the cations in various salt solutions is shown in the following Table II. One tenth gram of quininium exchange indicator compound was placed in each of seven test tubes to each of which was added 10 milliliters of various solutions containing the cations to be tested. Table II shows that no quininium was displaced by placing the resin indicator compound in distilled water of a pH of 5.7. The quininium cation of this cation indicator compound was displaced very faintly by the potassium, calcium and sodium cations present in Ringer's solution. Likewise, the quininium cation of this exchange indicator compound was displaced very faintly by the calcium, potassium and sodium cations present in a 0.7% solution of calcium chloride, potassium chloride, and sodium chloride respectively. The quininium cations were displaced more readily by the magnesium cation of a 0.7% solution of magnesium sulphate.

*Table II*

| Solution | Cations Present | Fluorescence |
|---|---|---|
| Ringer's | Na, K, Ca | Very Faint. |
| 0.7% CaCl | Na | Do. |
| 0.7% KCl | K | Do. |
| 0.7% NaCl | Na | Faint. |
| 0.7% MgSO$_4$ | Mg | Strong. |
| Distilled H$_2$O | None | None. |

To demonstrate the relationship between the pH of gastric juice and the displacement of the quininium cation from the quininium resin indicator compound, eleven samples of gastric juice were obtained. A sample of 0.1 gm. of quininium resin indicator compound was reacted with a 10 milliliter solution of each of the gastric juice samples. The resulting solution was tested for fluorescence. The following Table III sets forth the results of these reactions.

*Table III*

| Gastric Juice, pH | Fluorescence |
|---|---|
| 1.10 | Strong |
| 1.30 | Strong |
| 1.42 | Strong |
| 1.78 | Strong |
| 2.41 | Strong |
| 3.01 | Medium |
| 3.20 | Medium |
| 3.98 | None |
| 4.72 | None |
| 7.68 | None |
| 8.20 | None |

Table III demonstrates that the hydrogen cation was the cation responsible for the displacement of the quininium cation from the quininium resin indicator compound. If other cations such as sodium, potassium, etc. were responsible for the displacement of the quininium cation, the displacement of the quininium cation should also have occurred where the pH of the gastric juice was 3.98 and above, because gastric juice always contains considerable amounts of Na$^+$ cation and small amounts of Ca$^{++}$ and Mg$^{++}$ cations.

EXAMPLE II

"SE" will be used to indicate the 2,4-diamino-4'-ethoxyazobenzene cation in designating the new indicator exchange compound. The acid form of the cation exchange resin XE–96 is used to obtain the dye resin indicator compound. This compound contains a predetermined critical amount of serenium (2,4-diamino-4'-ethoxyazobenzene monohydrochloride) to the extent of .05 millimole serenium per gram of resin. This compound was tested with a series of aqueous solutions of hydrochloric acid of varying hydrogen ion concentration as well as with a series of human gastric juice specimens of varying hydrogen ion concentration. Such a study (Table IV) reveals that the amount of (SE)$^+$ cation displaced into solution depends on the H ion concentration to such an extent that with hydrogen ion concentration less than a pH of 3.8 insignificant amount of SE cations are displaced from the dye resin complex.

*Preparation of SE indicator exchange compound.*—A solution of 0.452 g. of 2,4 diamino-4'-ethoxyazobenzene monohydrochloride in 70 ml. of 70% ethyl alcohol was added slowly during stirring to a mixture of 5 g. of the hydrogen form of granular copolymer of methacrylic acid and divinyl benzene in 30 ml. of 70% ethyl alcohol. This mixture was stirred at room temperature for six hours.

The solution was decanted off and the resin was thoroughly washed with distilled water. A mixture of the resin and distilled water was stirred at room temperature for four hours. If the decantate was colored, this washing procedure was repeated. The moist indicator exchange compound was over dried at 33° C. for thirty-six hours.

*Table IV*

HYDROCHLORIC ACID

| pH | Color of decantate |
|---|---|
| 1.8 | deep red. |
| 3.3 | red. |
| 3.8 | faint trace red. |
| 4.2 | very faint trace red. |
| 4.9 | no color. |

GASTRIC JUICE

| pH | Color of decantate |
|---|---|
| 1.6 | deep red. |
| 2.2 | deep red. |
| 4.3 | faint trace red. |
| 5.0 | very faint trace red. |
| 7.0 | no color. |

Since the average gastric normal juice contains H cation in concentration greater than that corresponding to a pH of 3.8 this serenium compound can be used to show whether gastric juice contains a hydrogen ion concentration less than or greater than that corresponding to a pH of 3.8.

These anion resin compound indicators are used to determine normal and abnormal chemical conditions in the stomach secretions, as already stated.

The concentration of indicator ions in the ion exchange resin indicator compound is a fraction of the total capacity of the ion exchange resin to adsorb such ions. The critical quantities of indicator ions therefore are less than the total capacity of said ion exchange resins for combination with said ions. It is a feature of this invention that these critical quantities of indicator ions, or critical ranges of quantities of indicator ions, in combination with the ion exchange resins is less than the total capacity of these ion exchange resins for these indicator ions.

One of the features of this invention is that the cation exchange resin, granular copolymer of methacrylic acid and divinyl benzene, is not toxic and the ion exchange indicator compounds prepared from this exchange resin are non-toxic. The ion exchange indicator compounds may be administered to patients to indicate the presence or absence of certain stomach conditions. It is, therefore, an advantage of this invention that the ion exchange indicator compound is of assistance in diagnosis. The indicator compound—quininium—was administered to patients to demonstrate that the quininium cation would be displaced in vivo by the hydrogen ions present in the gastric secretion. The quininium cation so displaced is tested readily in the blood and/or urine since it is absorbed readily from the intestinal tract and is excreted into the urine. Fairly simple tests were used to determine the presence of the quininium cation in the blood or urine.

In performing these tests, the following procedure was used. The individual took no food after midnight. At a designated hour the next morning the individual urinated and saved this urine for a control. The individual then drank a glass of water followed by alcohol preferably in a quantity of 50 cc. of 7% alcohol followed by another glass of water.

After consuming the alcohol, the individual urinated and saved the urine as a second control. A dose was then prepared of the ion exchange resin indicator compound. The preferred dose is 2 grams of the ion exchange resin indicator compound mixed with 50 cc. of a 7% alcohol solution. This dose is an example of the doses referred to herein. The dose was stirred vigorously then drunk immediately. The individual then drank ½ glass of water. The individual then urinated 1, 2 and 3 hours after consuming the dose. Each urine specimen was saved separately and tested for the detection and determination of displaced indicator ions.

The gastric acidity of the individuals who were the subjects of these tests was determined by removing samples of the gastric juice from each of the individuals by the usual intubation technique. The gastric acidity tests of the samples so obtained indicated that the subjects could be divided into a group in whom no free hydrochloric acid was present in the gastric juice and a group in whom there was free hydrochloric acid in the gastric juice. Each of the subjects was tested for free hydrochloric acid in the gastric juice by use of the ion exchange indicator compound of this invention. The results of these tests are shown in the following Table V. In Table V each of the individual subjects of the test are listed by number.

*Table V.—Time interval between oral administration of quininium indicator exchange compound and appearance of quininium cations in urine of individuals with and without free gastric acid*

| Free HCl Secretion After Alcohol Stimulation (Intubation Technique) | Number of Individuals Tested | Number of Individuals Showing Quininium Cations in Urine | | |
|---|---|---|---|---|
| | | Hour of Quinine Excretion | | |
| | | Control | First | Second |
| Present | 180 | 0 | 174 | 180 |
| Absent | 43 | 0 | 0 | 5 |

It will be noted from Table V that the group in whom free HCl was present by the intubation technique only six individuals failed to excrete the quinine in the first hour and all excreted it in the second hour urine. In the individuals in whom no free HCl was present by the intubation technique none excreted quinine in the first hour urine and only 5 excreted it in the second hour urine. In this small group in whom quinine appeared for the first time only in the second hour urine, a simple quantitative test showing the amount of quinine excreted in the second hour urine readily determines whether the individual has a stomach hydrochloric secretion of a normal minimal amount.

The following is a table of the results from the tests using the serenium ion exchange resin indicator compound:

*Table VI.—Time interval between oral administration of serenium indicator exchange compound and appearance of serenium cations in urine of individuals with and without free gastric acid*

| Free HCl Secretion After Alcohol Stimulation (Intubation Technique) | Number of Individuals Tested | Number of Individuals Showing Serenium Cations in Urine | | |
|---|---|---|---|---|
| | | Hour of Serenium Excretion | | |
| | | Control | First | Second |
| Present | 5 | 0 | 2 | 5 |
| Absent | 4 | 0 | 0 | 1 |

From Tables V and VI, it can be seen that the quininium and serenium ion exchange indicator compounds produced by the method herein described, and used in individuals by the technique herein described, can be used as a test to determine the presence or absence of free HCl in the gastric juice of man. This type of examination has a very important place in both preventive and therapeutic medicine. In preventive medicine it can be used in mass examinations in order to know the percentage of people over a certain age who contain no free HCl in their stomach secretions.

It is a feature of this invention that a number of ionic concentrations may be tested for by varying the minimum amount of indicator ion in the ion exchange resin indicator compound.

It will be understood in setting forth the concentrations and amounts of indicator ions in a dose of ion exchange resin indicator compound in this description, that the reference is to displaceable indicator ions.

Other innocuous and/or easily detectable harmless substances may be used to produce color reactions or manifest themselves in other easily ascertainable ways when they appear in the blood, or are excreted into the urine, saliva, sweat, etc. By such tests, these substances may indicate various levels of hydrogen ions of the gastric secretion. These tests thus may be used to indicate various chemical or physiological conditions of the stomach, both normal and abnormal.

The ion exchange resins of this invention are complex synthetic polymers. These resins exhibit properties combining with various charged ions. This ability to actively combine with various ions is derived from various groups incorporated in the resins. In the above formulae in the reaction equations, the resin is symbolized by the letter R and the group that provides the resin with its exchange actively is shown in its molecular form. The subscript "$n$" when used in the reaction equations indicates an indefinite number.

The above embodiment of this invention in a test for a minimal concentration of hydrogen ion in gastric juice is for the purpose of description and it is not intended that the invention should be limited thereto. It will be understood that this invention may be applied to the determination of other ion concentrations in solution.

Therefore, it is intended to limit this invention by the scope of the appended claims.

This application is a continuation in part of our copending application Serial No. 146,384, filed February 25, 1950, titled "Ion Exchange Resin Indicator Compound."

We claim:

1. A diagnostic indicator ion exchange compound for determining without intubation whether the pH of gastric juice in a stomach is above or below a predetermined pH value comprising a non-toxic, insoluble, granulated, cat-ion-exchange, synthetic polymer resin having bound thereon from about 0.01 millimoles to about 0.25 millimole of displaceable indicator cation per gram of resin so as to be displaceable from the ion exchange resin predominantly by the ions from free hydrochloric acid secreted in the stomach, said indicator ion selected from the group consisting of quininum ion and 2,4-diamino-4'-ethoxyazobenzene cation, said indicator ion being absorbed readily from the gastro intestinal tract and being easily detected in urine and blood.

2. A diagnostic compound as claimed in claim 1 wherein said indicator ion is 2,4-diamino-4'-ethoxyazobenzene cation.

3. A diagnostic compound as claimed in claim 1 wherein said indicator ion is quininium cation.

4. A diagnostic compound as claimed in claim 3 wherein the amount of said quininium cation is from about 0.025 to about 0.25 millimole per gram of said resin.

References Cited in the file of this patent

UNITED STATES PATENTS 2,054,903   Hagedorn _____ Sept. 22, 1936

OTHER REFERENCES

Markus: Arch. Biochem., vol. 29, pages 159 to 165 (1950).

Martz et al.: Journal Lab. and Clin. Med., vol. 36, pages 962 to 963 (1950).

"Amberlite MB-3," pages 1 and 2, published May 1950 by Rohm and Haas Company, Philadelphia, Pa.